United States Patent
Meyer et al.

(10) Patent No.: US 9,797,547 B2
(45) Date of Patent: Oct. 24, 2017

(54) COMPUTER AND MONITOR MOUNTING ADAPTER

(71) Applicants: Brandon Meyer, Goodfield, IL (US); Chance Knapp, Goodfield, IL (US)

(72) Inventors: Brandon Meyer, Goodfield, IL (US); Chance Knapp, Goodfield, IL (US)

( * ) Notice: Subject to any disclaimer, the term of this patent is extended or adjusted under 35 U.S.C. 154(b) by 0 days.

(21) Appl. No.: 14/991,500

(22) Filed: Jan. 8, 2016

(65) Prior Publication Data

US 2016/0201845 A1 Jul. 14, 2016

Related U.S. Application Data

(60) Provisional application No. 62/101,500, filed on Jan. 9, 2015.

(51) Int. Cl.
| | |
|---|---|
| *F16L 3/00* | (2006.01) |
| *F16M 13/02* | (2006.01) |
| *F16M 11/04* | (2006.01) |
| *F16M 11/22* | (2006.01) |

(52) U.S. Cl.
CPC ............ *F16M 13/02* (2013.01); *F16M 11/04* (2013.01); *F16M 11/22* (2013.01); *Y10T 403/64* (2015.01); *Y10T 403/642* (2015.01); *Y10T 403/645* (2015.01)

(58) Field of Classification Search
CPC ........ F16M 11/08; F16M 11/10; F16M 11/02; F16M 11/04; F16M 13/02; F16M 11/22; Y10T 403/645; Y10T 403/642; Y10T 403/64

USPC ......... 248/121, 686, 220.21, 220.31, 222.14, 248/224.8, 231.9, 917, 919, 920, 921, 9, 248/22, 923, 924, 518, 558, 645, 911, 248/912, 126, 205.1
See application file for complete search history.

(56) References Cited

U.S. PATENT DOCUMENTS

| | | | | |
|---|---|---|---|---|
| 6,446,913 B1 * | 9/2002 | Schroeder | ................. | F16B 1/00 248/222.52 |
| 6,510,049 B2 * | 1/2003 | Rosen | ................... | F16M 11/105 248/919 |
| 6,634,407 B1 * | 10/2003 | Strohmeyer | .............. | E06B 9/24 160/116 |
| 7,377,603 B2 * | 5/2008 | Quijano | .................. | G06F 1/181 312/223.1 |
| 7,424,994 B2 * | 9/2008 | Jeong | ..................... | F16M 11/10 248/276.1 |

(Continued)

*Primary Examiner* — Kimberly Wood
(74) *Attorney, Agent, or Firm* — Dunlap Bennett & Ludwig PLLC

(57) ABSTRACT

A mounting adapter for mounting a computer or monitor to a stand is provided. The mounting adapter includes a first plate and a second plate. The first plate has an inner surface, an outer surface and a plurality of mounting holes disposed about a periphery. The second plate includes an inner surface, an outer surface, an upper panel, a lower panel and a plurality of mounting holes disposed about a periphery of the upper panel and the lower panel. At least one of the inner surface of the first plate and the lower panel includes a protruding lip in the shape of a circle. The protruding lip is sized to snuggly fit against an inner rim of a computer stand hole. Bolts fit through aligned mounting holes and secure the first plate and the second plate together, sandwiching the computer stand in between.

8 Claims, 4 Drawing Sheets

(56) References Cited

U.S. PATENT DOCUMENTS

| | | | |
|---|---|---|---|
| 7,559,520 B2* | 7/2009 | Quijano | F16M 11/00 248/309.1 |
| 7,719,832 B2* | 5/2010 | Kobara | G06F 1/1601 361/679.02 |
| 7,905,460 B2* | 3/2011 | Woods | F16M 11/04 248/220.21 |
| 7,909,295 B2* | 3/2011 | Powers | F16M 11/04 248/121 |
| 7,913,741 B1* | 3/2011 | Aulet | E06B 9/52 160/180 |
| 8,191,837 B2* | 6/2012 | Chen | G06F 1/1607 248/176.1 |
| 8,264,838 B2* | 9/2012 | Fujikawa | F16M 11/08 248/122.1 |
| 8,523,132 B2* | 9/2013 | Chen | G06F 1/1607 248/176.1 |
| 8,833,716 B2* | 9/2014 | Funk | F16M 13/02 248/309.1 |
| 9,027,892 B2* | 5/2015 | Boer | B60R 11/0235 248/222.52 |
| 2003/0075649 A1* | 4/2003 | Jeong | F16M 11/105 248/157 |
| 2005/0029414 A1* | 2/2005 | Jeong | F16M 11/10 248/122.1 |
| 2005/0041379 A1* | 2/2005 | Jang | F16M 11/04 361/679.27 |
| 2005/0284991 A1* | 12/2005 | Saez | F16M 11/04 248/122.1 |
| 2006/0076463 A1* | 4/2006 | Drew | F16M 11/02 248/121 |
| 2006/0261227 A1* | 11/2006 | Petrick | F16M 11/02 248/276.1 |
| 2008/0192418 A1* | 8/2008 | Zambelli | F16M 11/04 361/679.02 |
| 2011/0006176 A1* | 1/2011 | Krantz-Lilienthal | F16B 2/245 248/205.1 |
| 2013/0092805 A1* | 4/2013 | Funk | F16M 13/02 248/121 |
| 2014/0048658 A1* | 2/2014 | Chen | G06F 1/1607 248/56 |
| 2015/0354766 A1* | 12/2015 | Townsend, Jr. | F16M 13/022 362/370 |

* cited by examiner

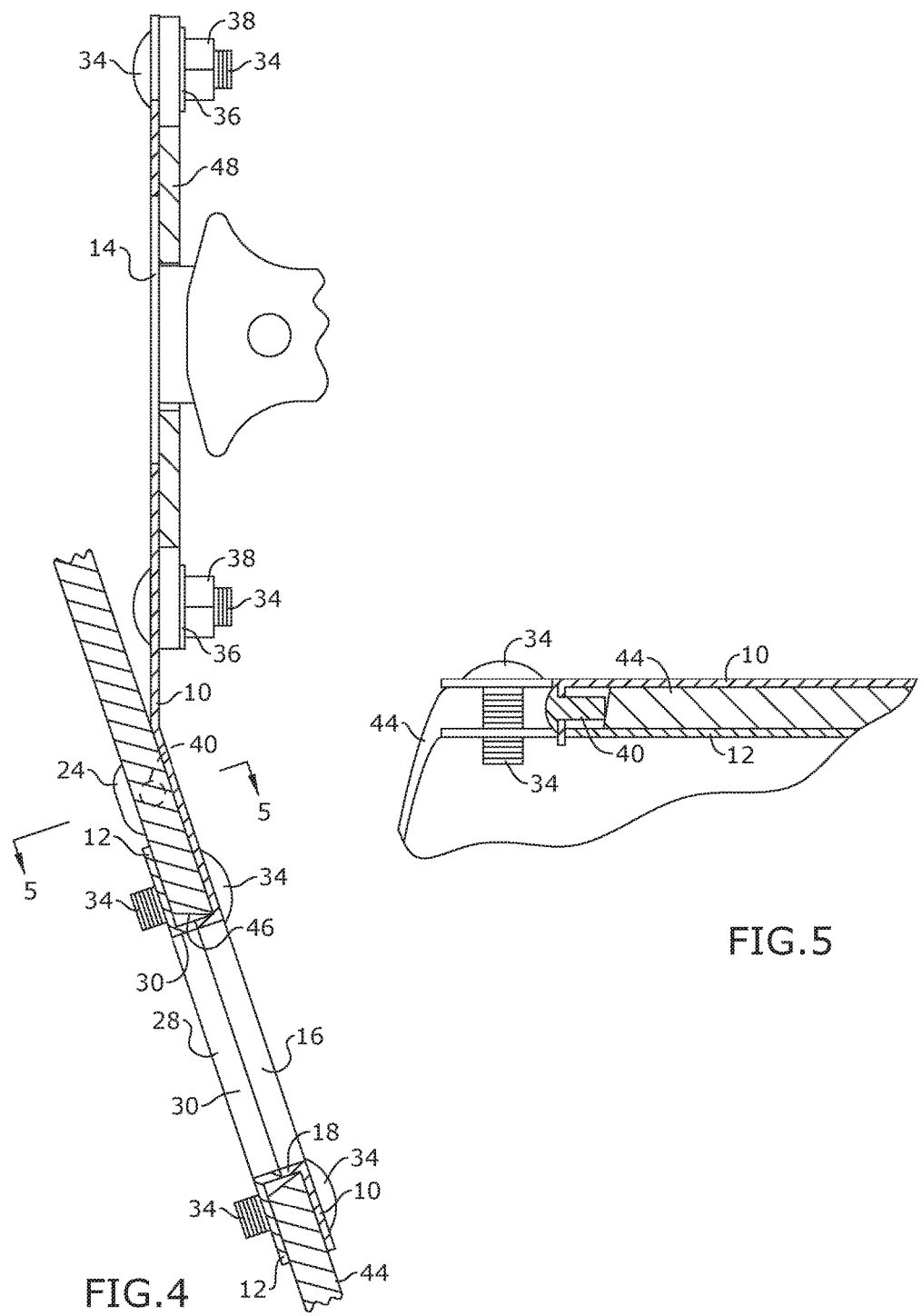

COMPUTER AND MONITOR MOUNTING ADAPTER

CROSS-REFERENCE TO RELATED APPLICATION

This application claims the benefit of priority of U.S. provisional application No. 62/101,500, filed Jan. 9, 2015, the contents of which are herein incorporated by reference.

BACKGROUND OF THE INVENTION

The present invention relates to a mounting adapter and, more particularly, to a computer and monitor mounting adapter.

The Flat Display Mounting Interface (FDMI), also known as VESA Mounting Interface Standard (MIS) or colloquially as VESA mount, is a family of standards defined by the Video Electronics Standards Association for mounting flat panel monitors, televisions (TVs), and other displays to stands or wall mounts. It is implemented on most modern flat-panel monitors and TVs. Current iMacs® are not compatible with VESA mounts.

As can be seen, there is a need for an adapter that mounts a current IMac® to a VESA mount.

SUMMARY OF THE INVENTION

In one aspect of the present invention, a mounting adapter comprises: a first plate comprising an inner surface, an outer surface, and a plurality of mounting holes disposed about a periphery of the first plate; a second plate comprising an inner surface, an outer surface, an upper panel, a lower panel, and a plurality of mounting holes disposed about a periphery of the upper panel and the lower panel, wherein at least one of the inner surface of the first plate and the lower panel comprises a protruding lip comprising a circular shape, and the plurality of mounting holes of the first plate align with the plurality of mounting holes of the lower panel.

These and other features, aspects and advantages of the present invention will become better understood with reference to the following drawings, description and claims.

BRIEF DESCRIPTION OF THE DRAWINGS

FIG. 4 is a section view of the present invention, taken along line 4-4 in FIG. 1;

FIG. 5 is a section view of the present invention, taken along line 5-5 in FIG. 4;

DETAILED DESCRIPTION OF THE INVENTION

Figure 1:
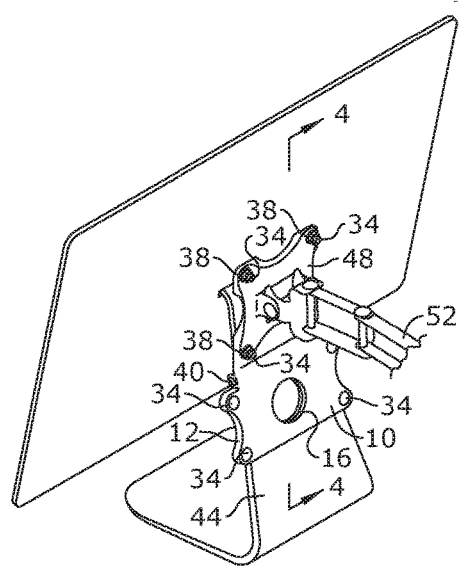
FIG. 1 is a perspective view of an embodiment of the present invention shown in use.
Figure 2:
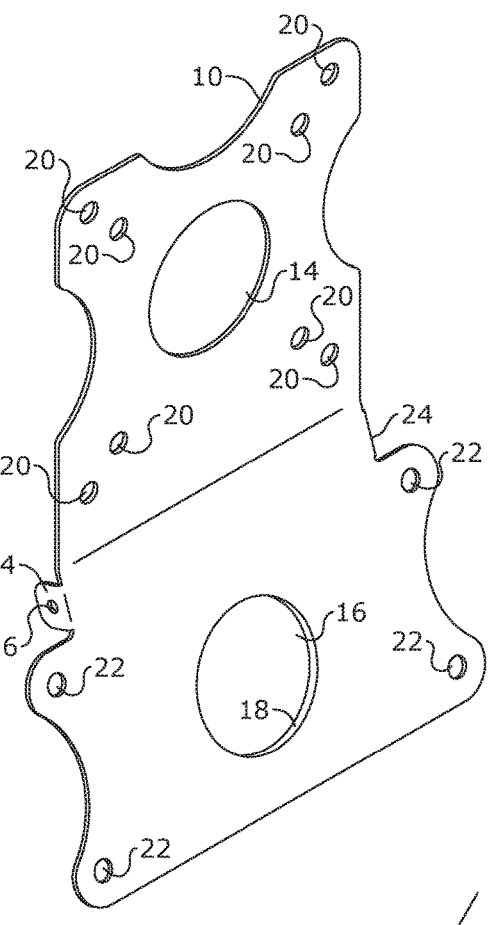
FIG. 2 is a perspective view of a first plate and a second plate of the present invention.
Figure 3:
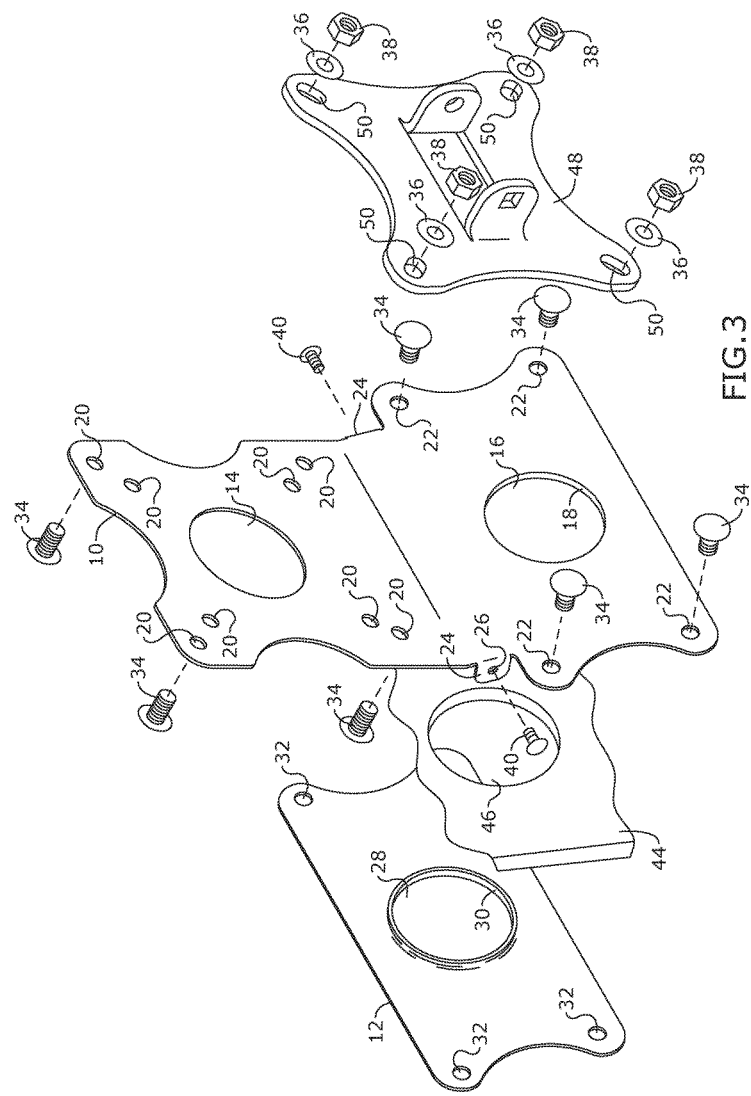
FIG. 3 is an exploded view of an embodiment of the present invention, shown with an exemplary VESA plate.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an adapter for mounting iMac® computers to VESA mounts. The present invention is universal and works with either the 21.5" or the 27" iMac®. The present invention attaches to the iMac® and then attaches to any VESA 100×100 mount. The present invention includes a first plate and a second plate. The second plate has an upper panel that is attachable to any VESA compatible mount or stand. A lower panel of the second plate attaches to the first plate and sandwiches the iMac® stand in between. The present invention may further include an adapter ring used to allow the kit to fit any current iMacs®. The present invention may further include mounting hardware such as bolts and nuts, for bolting the kit together as well as side screws to center and stabilize the mount.

Referring to FIGS. 1 through 7, the present invention includes a mounting adapter having a first plate 12 and a second plate 10. The first plate 12 has an inner surface, an outer surface and a plurality of mounting holes 32 disposed about a periphery of the first plate 12. The second plate 10 includes an inner surface, an outer surface, an upper panel, a lower panel and a plurality of mounting holes 20, 22 disposed about a periphery of the upper panel and the lower panel. At least one of the inner surface of the first plate and the lower panel includes a protruding lip 18, 30 in the shape of a circle. The protruding lip 18, 30 is sized to snuggly fit against an inner rim of an iMac® stand hole 46. The plurality of mounting holes 32 of the first plate 12 align with the plurality of mounting holes 22 of the lower panel. Bolts 34 fit through the aligned mounting holes 22, 32 and secure the first plate 12 and the second plate 10 together, sandwiching an iMac® stand 44 in between.

In certain embodiments, the first plate 12 includes a first circular lip 30 protruding from the inner surface and the lower panel of the second plate 10 includes a second circular lip 18 protruding from the inner surface. In such embodiments, the first and second circular lips 30, 18 align with one another and may have the same diameter. Both the first and second circular lips 30, 18 extend into the opening 46 of the iMac® stand 44, or other monitor stand, and snuggly fit against the inner edge, thereby stabilizing the first plate 12 and the second plate 10 to the iMac® stand 44. In certain embodiments, an opening 28 is formed in between the first circular lip 30 of the first plate 12, and an opening 16 is formed through the second circular lip 18 of the second plate 10. An opening 14 may also be formed through a center portion of the upper panel. The openings 14, 16, 28 allow users to easily manipulate the first plate 12 and second plate 10.

Figure 6:
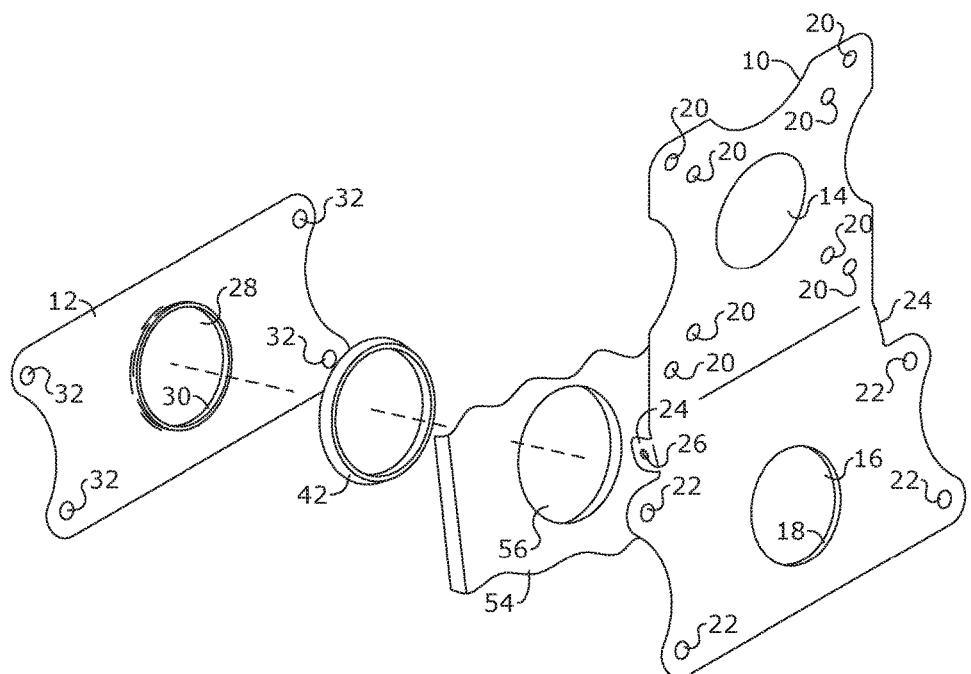
FIG. 6 is an exploded view of an embodiment of the present invention in use with an adapter ring.
Figure 7:
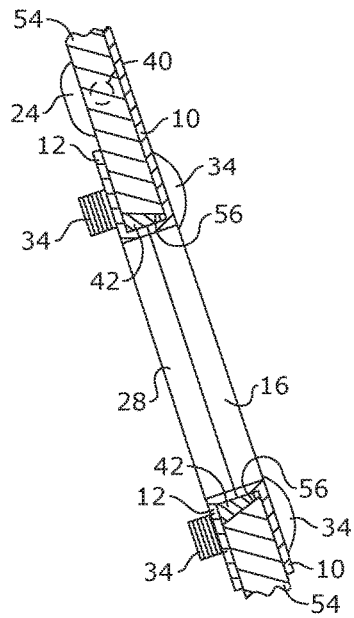
FIG. 7 is a section view of an embodiment of the present invention in use with the adapter ring of FIG. 6.

The present invention may further include an adapter ring 42. The adapter ring 42 allows the mounting adapter of the present invention to attach to larger openings 56 of a larger iMac® stand 54. In such embodiments, the adapter ring 42 is sized to snuggly fit around the first circular lip 30 of the first plate 12. The adapter ring 42 includes a ring protruding lip that extends beyond the first circular lip 30 of the first plate 12. An outer portion of the adapter ring 42 is sized to snuggly fit within the larger opening of the larger iMac® stand 54. The second circular lip 18 of the second plate 10 is sized to snuggly fit against the ring protruding lip. The first plate 12 and the second plate 10 are bolted together as illustrated in FIGS. 6 and 7.

In certain embodiments, the present invention may include additional stabilizing side tabs 24. The side tabs 24 may extend from opposing side edges of the second plate. In certain embodiments, the side tabs 24 may be located near where the upper panel and the lower panel meet. The side tabs 24 may extend from the side edges in the direction of the inner surface of the second plate 10 and may be substantially perpendicular relative to the inner surface. Each of the side tabs 24 include tab mounting holes 26 to receiving centering screws 40 that are driven against the edges of the iMac® stand 44. The centering screws 40 further stabilize the mounting adapter to the iMac® stand 44.

In certain embodiments, the first plate 12 may be substantially planar. The second plate 10 may be non-planar, having a planar upper panel and a planar lower panel. The upper panel and the lower panel may be disposed at an angle relative to one another. This allows the upper panel to be properly mounted to a television mounting plate 48. In certain embodiments, the plurality of mounting holes 20 of the upper panel include a plurality of inner mounting holes 20 close to a center of the upper panel, and a plurality of outer mounting holes 20 farther away from the center of the upper panel. This allows the upper panel to be mounted to different sized television mounting plates 48. The plurality of mounting holes 20 of the upper panel are positioned to align with a plurality of mounting holes 50 formed through the television mounting plate 48.

A method of mounting an iMac® stand 44 to a television mounting plate 48 may include the following. The protruding lip 30 of the first plate 12 is inserted into the opening 46 on an inner side of the iMac® stand 44. The protruding lip 18 of the second plate 10 is inserted into the opening 46 of an outer side of the iMac® stand 44. Bolts 34 run through each of the aligned openings of the lower panel and into threaded openings of the first plate 12, thereby securing the first plate 12 and the second plate 10 together, sandwiching the iMac® stand 44 in between. The centering screws 40 are driven through the mounting holes 26 of the side tabs 24 to center the mounting adapter to the iMac® stand 44. The plurality of mounting holes 50 of the television mounting plate 48 are aligned with the plurality of mounting holes 20 of the upper panel. Bolts 34 run through each of the aligned openings 20, 50 of the television mounting plate 48 and the upper panel, and nuts 38 and washers 36 are secured to the ends of the bolts, thereby securing the television mounting plate 48 and the upper panel together. The television mounting plate 48 may be mounted to a television mounting arm 52, which may be secured to a wall.

The components of the present invention may be made of a hard and durable material, such as metal or hard plastics. In certain embodiments, the plates are made from steel using preformed molds. Presses and drills then form and cut the plate to the desired size and shape. The adapter rings may be plastic. The plastic adapter rings may be made by injecting plastic into special plastic molds to the desired shape and size. The present invention may also be made by 3D printing.

It should be understood, of course, that the foregoing relates to exemplary embodiments of the invention and that modifications may be made without departing from the spirit and scope of the invention as set forth in the following claims.

What is claimed is:

1. A mounting adapter comprising:
a first plate comprising an inner surface, an outer surface and a plurality of mounting holes disposed about a periphery of the first plate, wherein a first circular lip protrudes from the inner surface;
a second plate comprising an inner surface, an outer surface, an upper panel, a lower panel, side tabs extending from opposing edges near where the upper panel and the lower panel meet and a plurality of mounting holes disposed about a periphery of the upper panel and the lower panel, wherein a second circular lip protrudes from the inner surface of the lower panel, wherein
each of the first circular lip and the second circular lip is sized to fit within an opening formed through a computer stand, and
the plurality of mounting holes of the first plate align with the plurality of mounting holes of the lower panel.

2. The mounting adapter of claim 1, wherein a first opening is formed in between the first circular lip and a second opening is formed in between the second circular lip.

3. The mounting adapter of claim 1, further comprising a ring adapter sized to snuggly fit around the first circular lip and comprising a ring protruding lip extending beyond the first circular lip.

4. The mounting adapter of claim 1, wherein the upper panel and the lower panel are disposed at an angle relative to each other.

5. The mounting adapter of claim 1, wherein the plurality of mounting holes of the upper panel comprises a plurality of inner mounting and a plurality of outer mounting holes.

6. The mounting adapter of claim 1, wherein the plurality of mounting holes of the upper panel are positioned to align with a television mounting plate.

7. The mounting adapter of claim 1, wherein each of the side tabs comprise a tab mounting hole.

8. The mounting adapter of claim 1, further comprising a plurality of bolts each running through aligned mounting holes of the first plate and the second plate.

* * * * *